US008649036B2

(12) United States Patent
Habaguchi et al.

(10) Patent No.: US 8,649,036 B2
(45) Date of Patent: Feb. 11, 2014

(54) IMAGE FORMING APPARATUS AND COMPUTER READABLE MEDIUM STORING PROGRAM FOR AUTHENTICATING PRINT JOB INFORMATION OF A PRINT JOB

(75) Inventors: Katsuhito Habaguchi, Kanagawa (JP); Masahiko Yajima, Kanagawa (JP); Hirokazu Tanaka, Kanagawa (JP); Takashi Kikumoto, Kanagawa (JP); Bo Liu, Kanagawa (JP); Masayuki Iwasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 405 days.

(21) Appl. No.: 12/849,090

(22) Filed: Aug. 3, 2010

(65) Prior Publication Data
US 2011/0216351 A1 Sep. 8, 2011

(30) Foreign Application Priority Data
Mar. 8, 2010 (JP) .................................. 2010-050724

(51) Int. Cl.
*G06K 15/00* (2006.01)
(52) U.S. Cl.
USPC ........................................ 358/1.14; 358/1.15
(58) Field of Classification Search
USPC .............................................. 358/1.14, 1.15
See application file for complete search history.

(56) References Cited

U.S. PATENT DOCUMENTS

| 7,230,731 | B2* | 6/2007 | Dan et al. ...................... 358/1.14 |
| 7,284,061 | B2* | 10/2007 | Matsubayashi et al. ...... 709/229 |
| 7,447,654 | B2* | 11/2008 | Ben-Levy et al. .............. 705/37 |
| 2004/0008368 | A1* | 1/2004 | Plunkett et al. ............... 358/1.15 |
| 2005/0100378 | A1* | 5/2005 | Kimura et al. .................. 400/76 |
| 2005/0264840 | A1* | 12/2005 | Niitsuma ..................... 358/1.14 |
| 2005/0275866 | A1* | 12/2005 | Corlett ......................... 358/1.14 |
| 2006/0221375 | A1* | 10/2006 | Nagarajan et al. ........... 358/1.14 |
| 2008/0028438 | A1* | 1/2008 | Sakakibara ....................... 726/2 |

FOREIGN PATENT DOCUMENTS

| JP | 2002-055950 | 2/2002 |
| JP | 2003-223424 | 8/2003 |

* cited by examiner

*Primary Examiner* — Benny Q Tieu
*Assistant Examiner* — Quyen V Ngo
(74) *Attorney, Agent, or Firm* — Fildes & Outland, P.C.

(57) ABSTRACT

An image forming apparatus includes: a print command receiving unit that receives print command information indicating a print command; an authentication determination unit that determines whether or not the print command information received by the print command receiving unit includes authentication requirement information indicating that authentication is required upon print processing based on the print command; a determination unit that, when the authentication determination unit has determined that the print command information includes the authentication requirement information, determines whether or not an originator of the print command information and a user who performs the print processing based on the print command information are different; and a notification unit that, when the determination unit has determined that the originator of the print command information and the user who performs the print processing are different, notifies the user who performs the print processing of presence of the print command information.

7 Claims, 7 Drawing Sheets

PRINT JOB NOTIFICATION SYSTEM 1

PRINT SERVER 12 AND TERMINAL DEVICE 4

FIG. 5

| USER IDENTIFICATION INFORMATION | NOTIFICATION FORM | NOTIFICATION DESTINATION |
|---|---|---|
| USER #1 | ELECTRONIC MAIL | ELECTRONIC MAIL ADDRESS |
| USER #2 | POP-UP MESSAGE | IP ADDRESS |
| ... | ... | ... |
| USER #N | NOTIFICATION OF MOBILE PHONE NUMBER | MOBILE PHONE NUMBER |

NOTIFICATION-RELATED INFORMATION TABLE

FIG. 6

```
To: user_#1@fujizerox.co.jp
From: printsvr@fujizerox.co.jp
Subject: PRINT JOB PRESENCE NOTIFICATION
```

THERE IS PRINT JOB TO User_#1.
PRINTER NAME: PRINTER A
JOB NAME: JOB_01
TRANSMISSION COMPLETION TIME: 2010/01/01 12:00:00

NOTIFICATION OF PRINT JOB (ELECTRONIC MAIL)

IMAGE FORMING APPARATUS AND COMPUTER READABLE MEDIUM STORING PROGRAM FOR AUTHENTICATING PRINT JOB INFORMATION OF A PRINT JOB

CROSS-REFERENCE TO RELATED APPLICATIONS

This application is based on and claims priority under 35 USC 119 from Japanese Patent Application No. 2010-050724 filed Mar. 8, 2010.

BACKGROUND

Technical Field

The present invention relates to an image forming apparatus and a computer readable medium storing a program.

SUMMARY

According to an aspect of the present invention, there is provided an image forming apparatus including: a print command receiving unit that receives print command information indicating a print command; an authentication determination unit that determines whether or not the print command information received by the print command receiving unit includes authentication requirement information indicating that authentication is required for print processing based on the print command; a determination unit that, when the authentication determination unit has determined that the print command information includes the authentication requirement information, determines whether or not an originator of the print command information and a user who performs the print processing based on the print command information are different; and a notification unit that, when the determination unit has determined that the originator of the print command information and the user who performs the print processing are different, notifies the user who performs the print processing of presence of the print command information.

BRIEF DESCRIPTION OF THE DRAWINGS

An exemplary embodiment of the present invention will be described in detail based on the following figures, wherein:

FIG. 5 is a table as an example of a notification-related information table stored in a notification-related information table storage part;

FIG. 6 is an example of print job presence notification; and

DETAILED DESCRIPTION

Print Job Notification System 1

Figure 1:
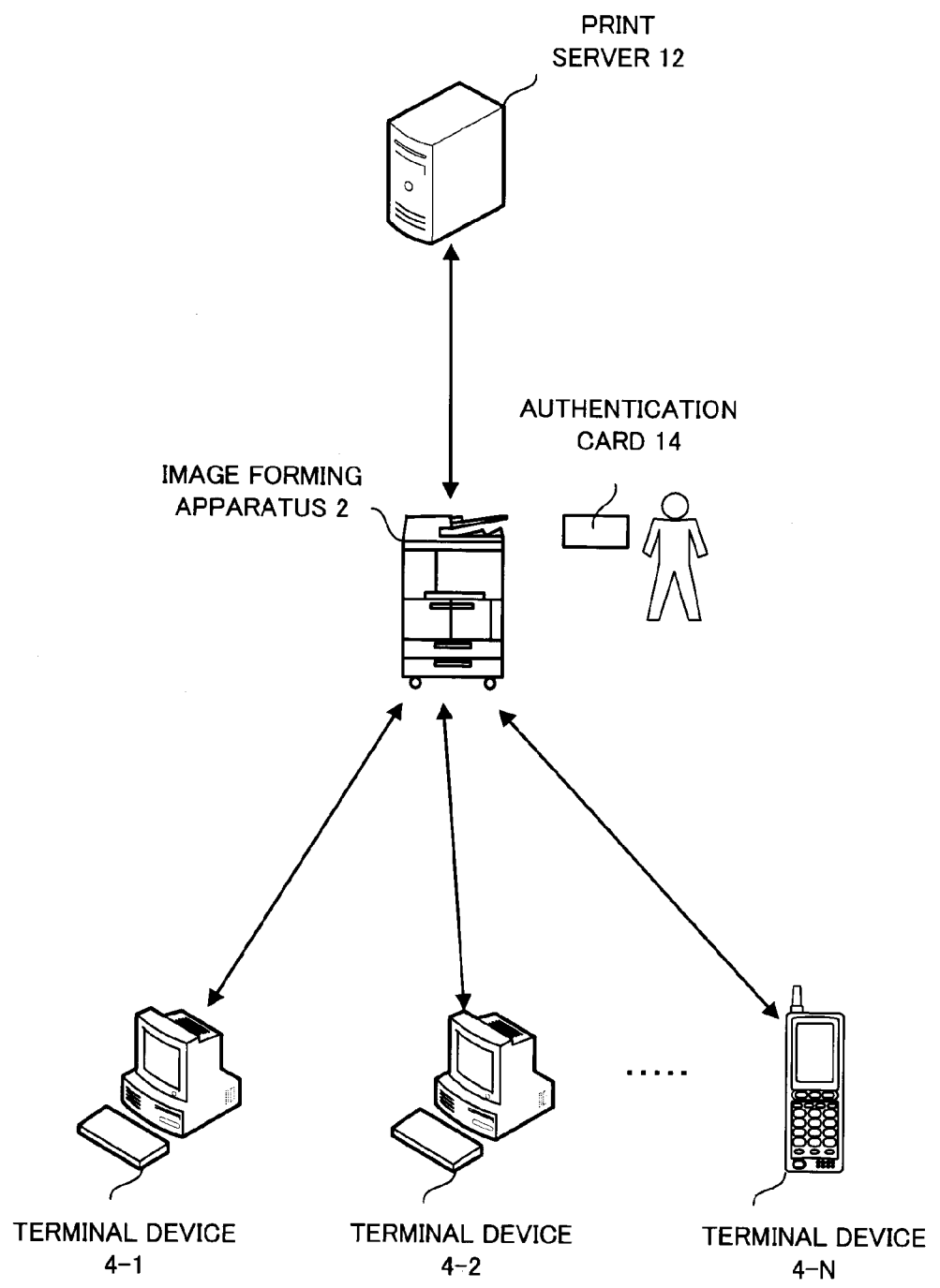
FIG. 1 illustrates a print job notification system according to a present exemplary embodiment.

FIG. 1 illustrates a print job notification system 1 according to the present exemplary embodiment.

As shown in FIG. 1, the print job notification system 1 has a print server 12, an image forming apparatus 2 and terminal devices 4-1 to 4-N (N is an integer equal to or greater than "1". Note that N is not always the same number).

Note that when any one of plural constituent elements such as terminal devices 4-1 to 4-N is given without being specified hereinbelow, it may be simply abbreviated to e.g. a "terminal device 4".

Note that the print server 12 and the image forming apparatus 2 are respectively single elements in the present exemplary embodiment; however, they may be respectively two or more.

Figure 4:
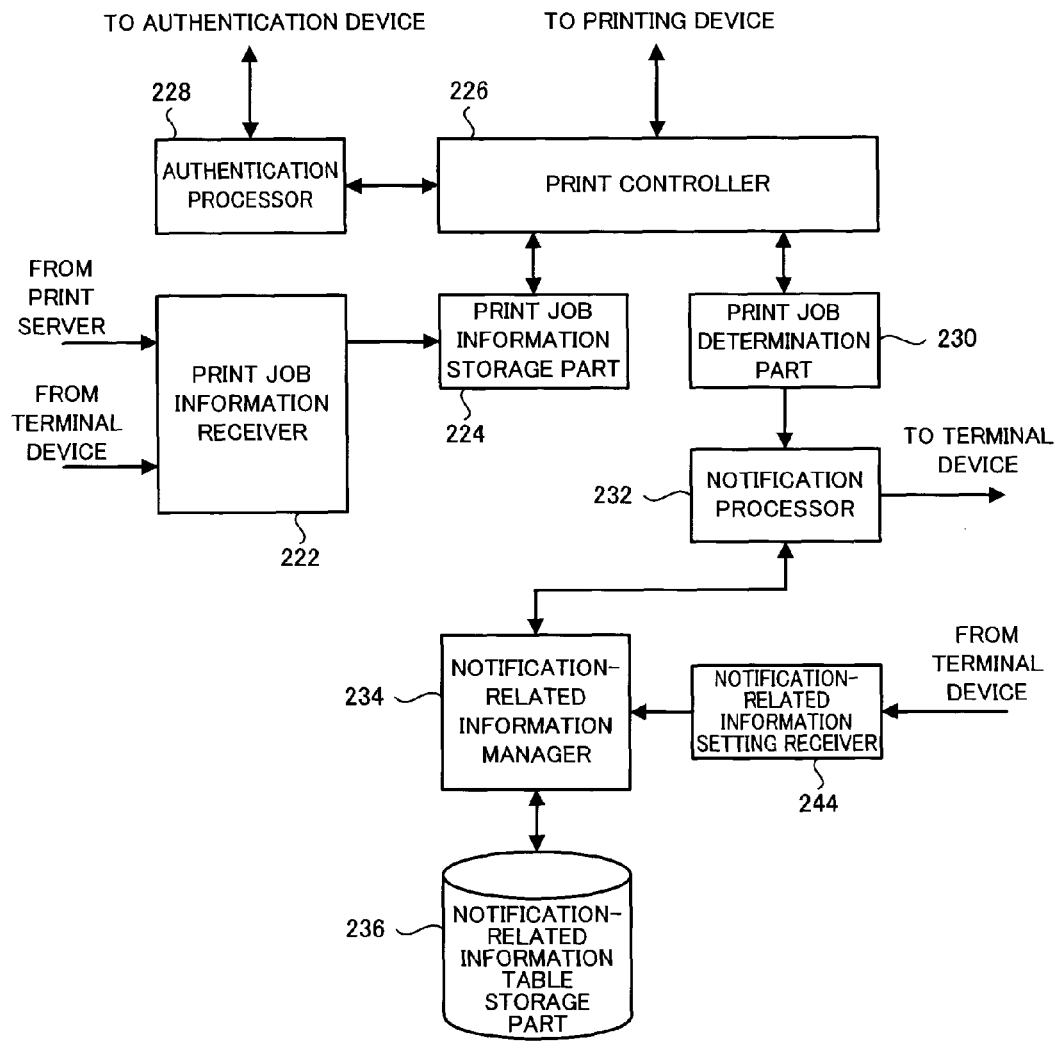
FIG. 4A is a block diagram showing an image forming apparatus program which operates in the image forming apparatus.
FIG. 4B is a table showing an example of print job information processed with the image forming apparatus program.

The print server 12 generates a print job (print command), then generates print job information (to be described later using FIG. 4B) indicating the print job, and transmits the generated print job information via a network to the image forming apparatus 2.

It may be arranged such that the generation of print job by the print server 12 is performed by an administrator's operation or the print server 12 itself automatically generates the print job.

Further, as in the case of the print server 12, the terminal device 4 generates a print job by a user's operation, then generates print job information indicating the print job, and transmits the generated print job information via the network to the image forming apparatus 2.

The image forming apparatus 2 receives the print job information from the print server 12 or the terminal device 4, and performs print processing based on the received print job information.

Note that when the print job information includes information indicating that authentication is required (authentication requirement information), the image forming apparatus 2 that receives the print job information does not perform print processing immediately after the reception of the print job information, but performs print processing after execution of authentication processing.

The image forming apparatus 2 performs the authentication processing by using e.g. an authentication card 14 held by each user in which user identification information is stored.

Further, for example, when the print server 12 generates a print job requiring authentication and the destination of the print job information is a user of the terminal device 4, the originator of the print job information and the user who performs print processing based on the print job information are different.

In this case, to notify the user to perform the print processing of the presence of the print job, the image forming apparatus 2 notifies the terminal device 4 of the user, as the destination of the print job, of the presence of the print job information.

Note that in this case, it may be arranged such that the print server 12 adds information indicating the originator of the print job information and the user who performs print processing based on the print job information are different (originator/print performer different information) to the print job information.

Note that when the originator of the print job information is the user who performs print processing, the image forming apparatus 2 does not notify the terminal device 4 of the presence of the print job information.

When the originator of the print job information is the user who performs print processing, since the user recognizes the presence of the print job, the notification is troublesome.

[Hardware]

Figure 2:
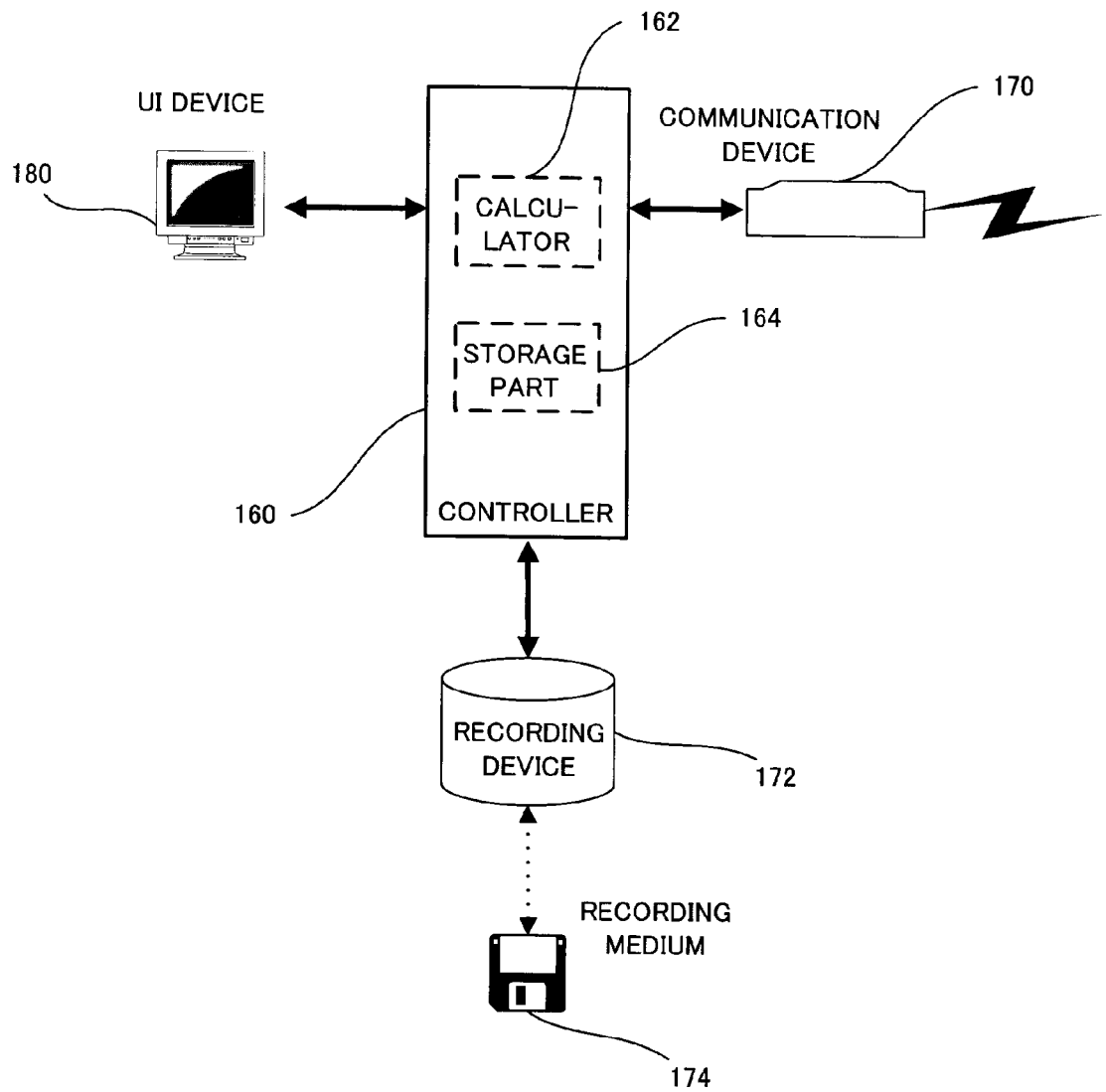
FIG. 2 illustrates a hardware configuration of a print server and a terminal device shown in FIG. 1.

FIG. 2 illustrates a hardware configuration of the print server 12 and the terminal device 4.

As shown in FIG. 2, the print server 12 and the terminal device 4 have a controller 160 including a calculator 162 such as a CPU, a storage part 164 such as a memory and the like, a communication device 170, a recording device 172, and a user interface device (UI device) 180.

That is, the print server 12 and the terminal device 4 have hardware configuration as a computer capable of information processing and communication with another processing device or terminal.

Further, in the following respective figures, substantially the same constituent elements and processing have the same reference numerals.

The UI device 180 includes a display device such as an LCD (Liquid Crystal Display) or a CRT (Cathode Ray Tube) display, a keyboard, a touch panel and the like.

Note that the terminal device 4 may be a mobile phone or the like.

Figure 3:
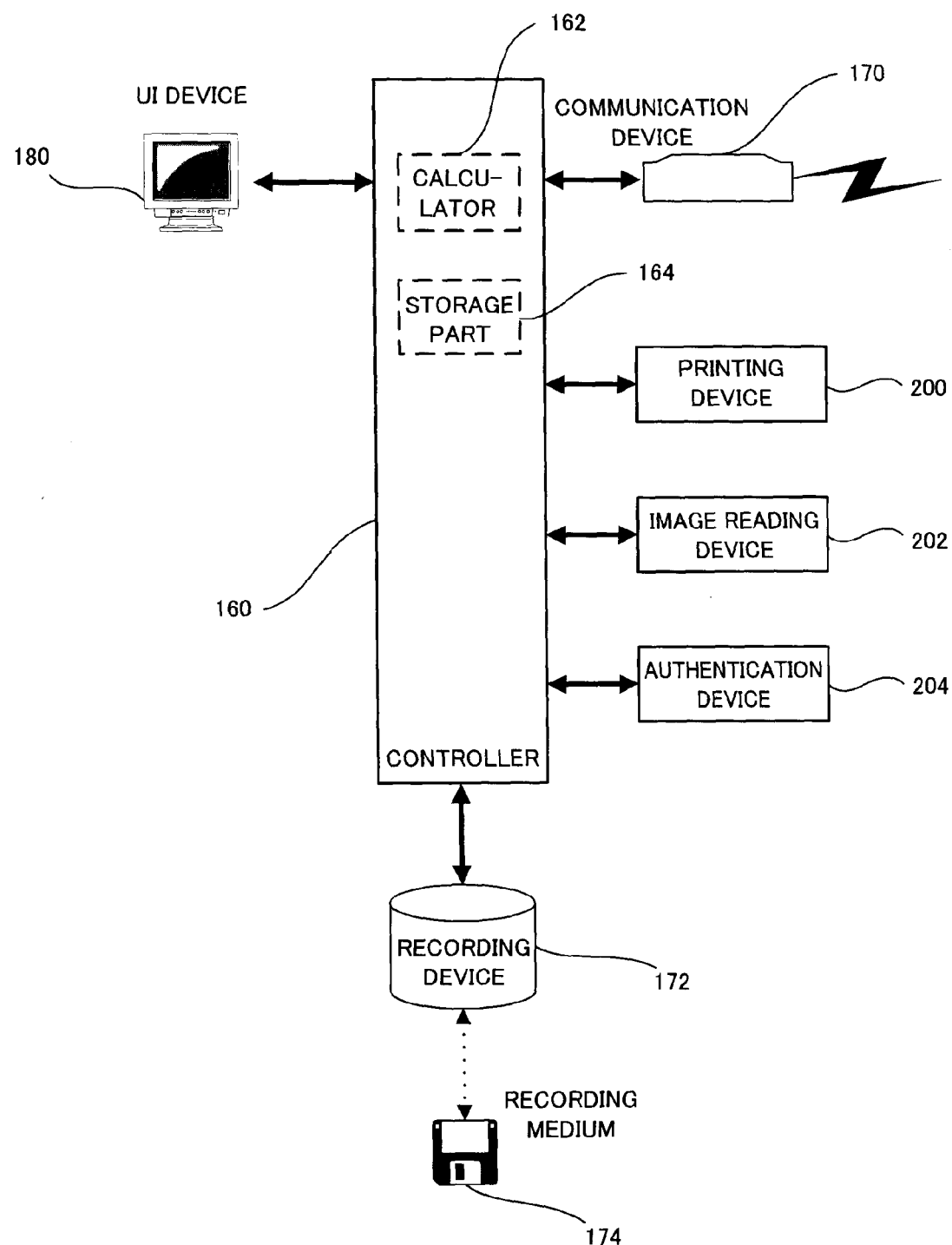
FIG. 3 illustrates a hardware configuration of an image forming apparatus shown in FIG. 1.

FIG. 3 illustrates a hardware configuration of the image forming apparatus 2.

As shown in FIG. 3, the image forming apparatus 2 has the controller 160 including the calculator 162, the storage part 164 and the like, the communication device 170, the recording device 172, the UI device 180, a printing device 200, an image reading device 202, and an authentication device 204.

The printing device 200, which is e.g. a printer, print-outputs character data, image data or the like on a recording medium such as paper.

An image reading device 202, which is e.g. a scanner, reads an image or the like from a recording medium and converts the read image into image data.

The authentication device 204 reads user identification information stored in the authentication card 14, and performs authentication processing necessary in print processing.

That is, the image forming apparatus 2 has a hardware configuration as a computer capable of information processing and communication with another image processing device or terminal.

[Program]

FIGS. 4A and 4B are a block diagram showing an image forming apparatus program 22 which operates in the image forming apparatus 2 and a table showing an example of print job information processed with the image forming apparatus program 22. FIG. 4A is a block diagram showing the image forming apparatus program 22, and FIG. 4B illustrates an example of the print job information.

As shown in FIG. 4A, the image forming apparatus program 22 has a print job information receiver 222, a print job information storage part 224, a print controller 226, an authentication processor 228, a print job determination part 230, a notification processor 232, a notification-related information manager 234, a notification-related information table storage part 236, and a notification-related information setting receiver 244.

The image forming apparatus program 22 is supplied to the image forming apparatus 2 via e.g. a storage medium 174 (FIG. 3), loaded to the storage part 164, and executed on an OS (not shown) installed in the image forming apparatus 2 by utilizing hardware resources of the image forming apparatus 2 (the respective software described hereinbelow are executed in the same manner).

In the image forming apparatus program 22, the print job information receiver 222 receives print job information from the print server 12 or the terminal device 4 via the network, and outputs the received print job information to the print job information storage part 224.

The print job information storage part 224 stores and manages the print job information from the print job information receiver 222.

As shown in FIG. 4B, the print job information requiring authentication includes a job identifier, transmission time information indicating time of transmission of the print job information, authentication requirement information indicating that authentication processing is required, print processing user identification information as identification information on a user who performs print processing, originator identification information indicating identification information on the originator of the print job information, and print data as the subject of the print processing.

When new print job information is stored in the print job information storage part 224, the print controller 226 determines whether or not the print job corresponding to the print job information requires authentication processing.

More particularly, the print controller 226 determines whether or not the print job information includes authentication requirement information.

When the print job information does not include authentication requirement information, that is, when the print job does not require authentication processing, the print controller 226 performs print processing regarding the print data based on the print job information.

On the other hand, when the print job information includes authentication requirement information, that is, when the print job requires authentication processing, the print controller 226 outputs the print processing user identification information included in the print job information to the authentication processor 228.

Further, in this case, the print controller 226 outputs the print job information to the print job determination part 230.

The authentication processor 228 compares the print processing user identification information from the print controller 226 with the user identification information included in the authentication card 14 obtained by the authentication device 204. When the both information correspond with each other, the authentication processor 228 outputs a signal indicative of correspondence (coincidence signal) to the print controller 226.

When the print controller 226 receives a coincidence signal from the authentication processor 228, the print controller 226 performs print processing regarding the print data based on the print job information.

The print job determination part 230 analyzes the print job information from the print controller 226, and determines whether or not the originator of the print job information and the user who performs print processing are different.

More particularly, the print job determination part 230 compares the print processing user identification information included in the print job information with the originator identification information and determines whether or not they correspond with each other.

When the print job determination part 230 determines that the originator of the print job information and the user who performs print processing are different, the print job determination part 230 instructs the notification processor 232 to transmit notification indicative of the presence of the print job (print job presence notification) to the terminal device 4 of a user corresponding to the print processing user identification information.

Note that in the above-described example, the print job determination part 230 compares the print processing user identification information included in the print job information with the originator identification information; however, it may be arranged such that when the originator/print performer different information is added to the print job information, the print job determination part 230 determines whether or not the print job information includes the originator/print performer different information.

Further, it may be arranged such that when the print job information includes identification information (IP address) of a particular print server 12 as originator identification information, the print job determination part 230 determines that the originator of the print job information and the user who performs print processing are different.

Further, it may be arranged such that when the print data included in the print job information includes a particular keyword, the print job determination part 230 determines that the originator of the print job information and the user who performs print processing are different.

When the notification processor 232 receives an instruction from the print job determination part 230, the notification processor 232 instructs the notification-related information manager 234 to extract notification-related information regarding a user corresponding to the print processing user identification information.

Note that the notification-related information means information for transmission of print job presence notification to the terminal device 4, which includes information indicating notification form and notification destination (address).

The notification-related information manager 234 stores the notification-related information into the notification-related information table storage part 236 and manages the information.

FIG. 5 is a table as an example of a notification-related information table stored in the notification-related information table storage part 236.

As shown in FIG. 5, the notification-related information table storage part 236 holds notification form and notification destination linked to each other by user.

For example, regarding a user #1 as a user of the terminal device 4-1, setting is made such that print job presence notification is received via electronic mail, and an electronic mail address of the user is stored.

Further, regarding a user #2 as a user of the terminal device 4-2, setting is made such that print job presence notification is displayed as a pop-up message on a screen of the terminal device 4-2, and an IP address of the terminal device 4-2 is stored.

Further, regarding a user #3 as a user of the terminal device 4-3, setting is made such that print job presence notification is received with a mobile phone, and a telephone number of the mobile phone is stored.

When the notification processor 232 (FIG. 4A) obtains notification-related information regarding a user corresponding to the print processing user identification information from the notification-related information manager 234, the notification processor 232 generates print job presence notification in a notification form indicated in the notification-related information, and transmits the print job presence notification to the notification destination (address) indicated in the notification-related information.

Further, when print processing is not performed after elapse of a predetermined period since the transmission of the print job presence notification, the notification processor 232 again transmits the print job presence notification to the notification destination (address) indicated in the notification-related information.

FIG. 6 is an example of print job presence notification.

FIG. 6 illustrates transmission of the print job presence notification via electronic mail.

As shown in FIG. 6, the print job presence notification includes a destination address, a print job originator's address, identification information (address or image forming apparatus name) of the image forming apparatus 2 holding the print job information, a job identifier, and print job transmission time.

The notification-related information setting receiver 244 (FIG. 4) receives a setting request regarding the notification-related information from terminal device 4. The notification-related information manager 234 performs setting of notification-related information based on the setting request from the notification-related information setting receiver 244.

[Print Job Presence Notification Transmission Processing]

Figure 7:
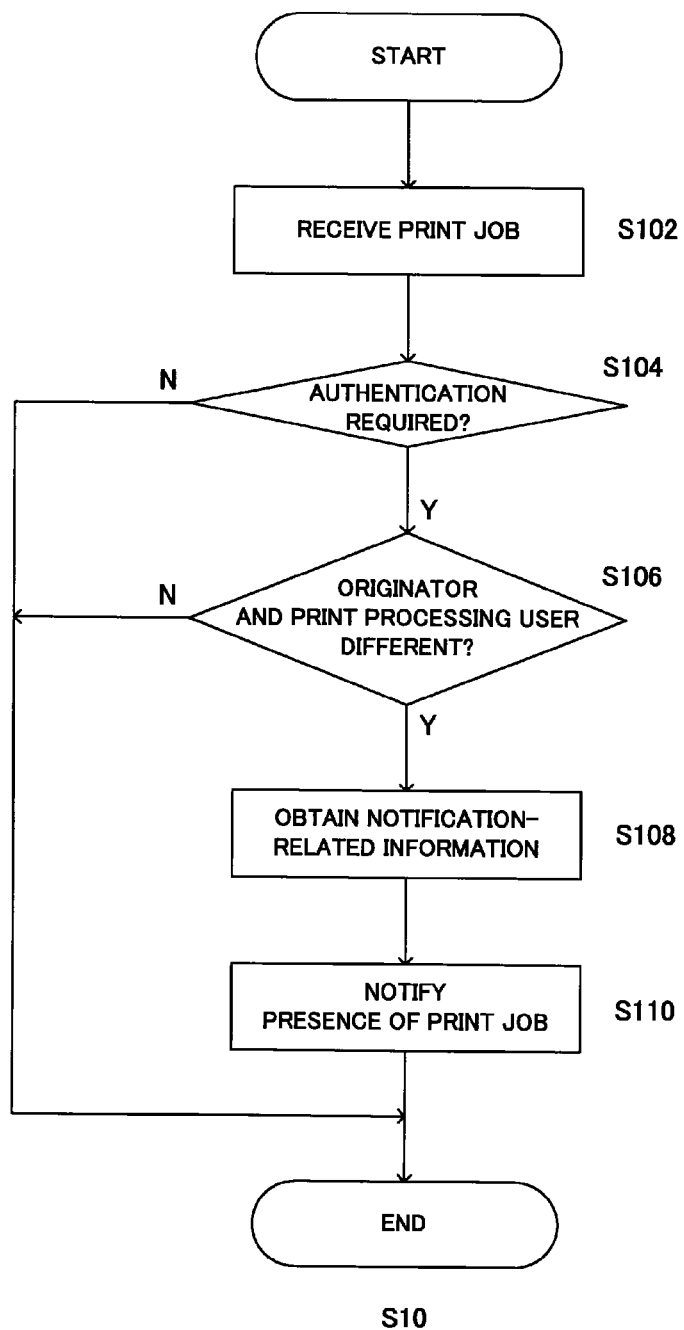
FIG. 7 is a flowchart showing print job presence notification transmission processing.

FIG. 7 is a flowchart showing print job presence notification transmission processing (S10).

At step S102, the print job information receiver 222 receives print job information.

At step S104, the print controller 226 determines whether or not the print job requires authentication processing.

When it is determined that authentication processing is required, the process proceeds to step S106, while when it is determined that authentication processing is not required, the process ends.

At step S106, the print job determination part 230 determines whether or not the originator of the print job information and a user who performs print processing are different.

When it is determined that the originator of the print job information and the user who performs print processing are different, the process proceeds to step S108. On the contrary, when it is determined that the originator of the print job information is the user who performs print processing, the process ends.

At step S108, the notification processor 232 obtains notification-related information regarding the user who performs the print processing.

At step S110, the notification processor 232 transmits print job presence notification to the terminal device 4 of the user who performs the print processing.

Note that in the above-described exemplary embodiment, authentication processing is performed by using the authentication card 14; however, the authentication processing may be performed by operating the UI of the image forming apparatus 2 and inputting a password, or the authentication processing may be performed by biological authentication.

In such case, the image forming apparatus 2 may store the user identification information and the password or biological authentication information linked to each other.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a print job receiving unit that receives print job information indicating a print job;
an authentication determination unit that determines whether or not the print job information received by the print job receiving unit includes authentication requirement information indicating that authentication is required for print processing based on the print job;

a determination unit that, when the authentication determination unit has determined that the print job information includes the authentication requirement information, determines whether or not an originator identification information, indicating an originator of the print job information, included in the print job information, and a print processing user identification information, indicating a user who performs the print processing based on the print job information, included, in the print job information, are different;

a notification unit that, when the determination unit has determined that the originator identification information and the print processing user identification information are different, notifies a notification destination corresponding to the print processing user identification information of presence of the print job, and does not notify when the determination unit has determined that the originator identification information and the print processing user identification information are the same; and a printing unit that, when the print processing user identification information included in the print job information corresponds with an identification information obtained by an authentication device, performs the print processing based on the print job information.

2. The image forming apparatus according to claim 1, wherein when a predetermined period has elapsed since notification of the presence of the print job information to the user, the notification unit again notifies a terminal of the user of the presence of the print job information.

3. The image forming apparatus according to claim 1, further comprising a storage unit that holds notification-related information regarding notification by the notification unit, wherein the notification unit notifies the user of the presence of the print job information based on the notification-related information stored in the storage unit.

4. The image forming apparatus according to claim 1, wherein the notification unit notifies a terminal of the user of the presence of the print job information.

5. The image forming apparatus according to claim 1, wherein the notification unit transmits an electronic mail for notification of the presence of the print job information to the user.

6. The image forming apparatus according to claim 1, further comprising:

a storage part that stores a notification-related information table in which the print processing user identification information and the notification destination are linked to each other, and an obtaining part that obtains the notification destination from the print processing user identification information and the notification-related information table;

wherein the notification unit notifies the notification destination obtained by the obtaining part.

7. A non-transitory computer readable medium storing a program causing a computer to execute a process for image forming, the process comprising:

receiving print job information indicating a print job;

determining whether or not the received print job information includes authentication requirement information indicating that authentication is required for print processing based on the print job;

when it is determined that the print job information includes the authentication requirement information, determining whether or not an originator identification information, indicating an originator of the print job information, included in the print job information, and a print processing user identification information, indicating a user who performs the print processing based on the print job information, included in the print job information, are different;

when it is determined that the originator identification information and the print processing user identification information are different, notifying a notification destination corresponding to the print processing user identification information of presence of the print job, and does not notify when it is determined that the originator identification information and the print processing user identification information are the same; and when it is determined that the print processing user identification information included in the print job information corresponds with an identification information obtained by an authentication device, performing the print processing based on the print job information.

* * * * *